(12) United States Patent
Sato

(10) Patent No.: US 6,518,956 B1
(45) Date of Patent: Feb. 11, 2003

(54) IMAGE PICK-UP APPARATUS

(75) Inventor: Hirokazu Sato, Gifu (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/580,226

(22) Filed: May 26, 2000

(30) Foreign Application Priority Data

May 28, 1999 (JP) .......................................... 11-150046

(51) Int. Cl.$^7$ ................................................ G09G 5/00
(52) U.S. Cl. .................................. 345/173; 348/333.01
(58) Field of Search ............................... 345/173, 169, 345/126; 348/333, 373, 333.06, 346, 347, 333.01

(56) References Cited

U.S. PATENT DOCUMENTS 5,936,619 A * 8/1999 Nagasaki et al. ........... 345/205
5,949,408 A * 9/1999 Kang et al. .................. 345/169
5,982,429 A * 11/1999 Kamamoto et al. ......... 348/333

* cited by examiner

Primary Examiner—Amare Mengistu
(74) Attorney, Agent, or Firm—Frommer Lawrence & Haug LLP; William S. Frommer; Hans R. Mahr

(57) ABSTRACT

A display unit is provided with a touch panel (contact-position detecting device) on the image display screen of the display unit and is used by inverting (0 and 180 degrees) or rotating (opening/closing state) the image display screen. An orientation detecting device is provided for detecting the orientation of the display unit. A table is provided for storing relationships between the coordinate positions of the touch panel and predetermined processing. When a predetermined operating part of the touch panel is touched, it is transformed into a coordinate position of the touch panel, and the predetermined processing corresponding to this coordinate position is performed.

4 Claims, 10 Drawing Sheets

| | | FIRST SWITCH | |
|---|---|---|---|
| | | ON | OFF |
| SECOND SWITCH | ON | MIRROR MODE | VCR MODE |
| | OFF | NORMAL RECORDING MODE | |

IMAGE PICK-UP APPARATUS

BACKGROUND OF THE INVENTION

1. Field of the Invention

The present invention relates to a technique for improving the operability of a contact-position detection device, such as a touch panel, mounted on an image display screen of a display unit which is used by changing the orientation of the image display screen.

2. Description of the Related Art

Some conventional display units, such as external display monitors mounted on, for example, a video camera or a still camera, are used by changing their orientations relative to a camera main unit. This enables the external display monitors to be used for various situations, for example, when the external display monitor is used as an electronic viewfinder (hereinafter referred to as an "EVF") for performing a recording operation (normal recording mode), when the video camera is used as a recording/playback device to play back recorded data (video cassette recorder (VCR) mode), and when the operator is a subject and takes an image of himself/herself while standing in front of the camera and observing the external display monitor (mirror mode).

Some conventional display units are loaded with a switch mounted on an image display screen of the display units, which is transparent so as to allow an image on the display screen to show through. Such a switch is a so-called touch panel. According to this touch panel, by directly touching an operation display image as a two-dimensional image on the display screen, a predetermined signal is output. The touch panel is known art and a detailed explanation thereof, such as the operation principle, will thus be omitted. By operating the touch panel for use in, for example, a video camera, commands concerning a tape running system, such as "stop", "rewind", "playback", and "forward", and commands concerning a recording mode, such as "focus", "shutter speed", "backlight correction", and "white balance", can be performed.

However, a display unit, such as an external display monitor, loaded with the above-described touch panel thereon presents the following problem. When the orientation of the external display monitor relative to the video camera main unit is changed, the positions at which operation buttons of the touch panel are displayed are also changed, thereby lowering ease of operation.

That is, for the operator who views the display unit from the front, the vertical direction and the horizontal direction of the display unit appear to be unchanged before and after changing the orientation of the display unit. By changing the orientation of the display unit, however, the coordinate position of an operating part of the touch panel is also changed. Therefore, the position of an operating part of the touch panel is disadvantageously changed without the operator noticing such a displacement.

More specifically, it is now assumed that the mode of a video camera loaded with the above-described external display monitor is changed from the recording mode to the VCR mode (vertically and horizontally inverted). The lower left part in the recording mode when the operator views the external display monitor from the front is changed to the upper right part in the VCR mode when the operator also views the external display monitor from the front. Thus, when the operator desires to perform the same operation in the VCR mode on a predetermined operating part (operation switch) of the touch panel as that corresponding to the lower left part in the recording mode, the operator is required to touch the operating part (operation switch) disposed on the upper right part, since the external display monitor has been vertically and horizontally inverted. The ease of operation is thus seriously deteriorated. This is because the operator determines the position of the operating part (operation switch) of the touch panel relative to the position as viewed from the front even if the orientation of the external display monitor is changed.

SUMMARY OF THE INVENTION

Accordingly, in view of the above background, it is an object of the present invention to maintain the operability of a contact-position detecting device, such as a touch panel, mounted on a display unit even if the orientation of the display unit is changed.

According to the present invention, there is provided an image pick-up apparatus including a display unit which is pivotally supported by a main unit of the image pick-up apparatus with respect to a vertical axis and which is rotatably supported by the main unit of the image pick-up apparatus with respect to a horizontal axis. An orientation detecting unit detects the orientation of a display screen of the display unit with respect to the main unit of the image pick-up apparatus. A contact-position detecting unit is mounted on the display screen of the display unit so as to detect which part of the display screen is touched. A memory unit stores relationships between coordinate positions of the contact-position detecting unit and predetermined processing. A display control unit displays an image on the display unit based on a signal from the orientation detecting unit, and upon detecting by the contact-position detecting unit that a predetermined operating part is touched, the display control unit transforms the predetermined operating part into a coordinate position in the memory unit according to the signal from the orientation detecting unit, thereby performing the predetermined processing.

With this arrangement, even if the orientation of the display unit is changed, it is detected by the orientation detecting unit, and the operating part of the contact-position detecting unit is transformed into a coordinate position, and the predetermined processing corresponding to the coordinate position is operated. This enables the operator to operate the contact-position detecting unit relative to a position at which the operator views, thereby improving ease of operation.

DESCRIPTION OF THE PREFERRED EMBODIMENTS

The present invention is described in detail below with reference to the drawings through illustration of a preferred embodiment.

Figure 1:
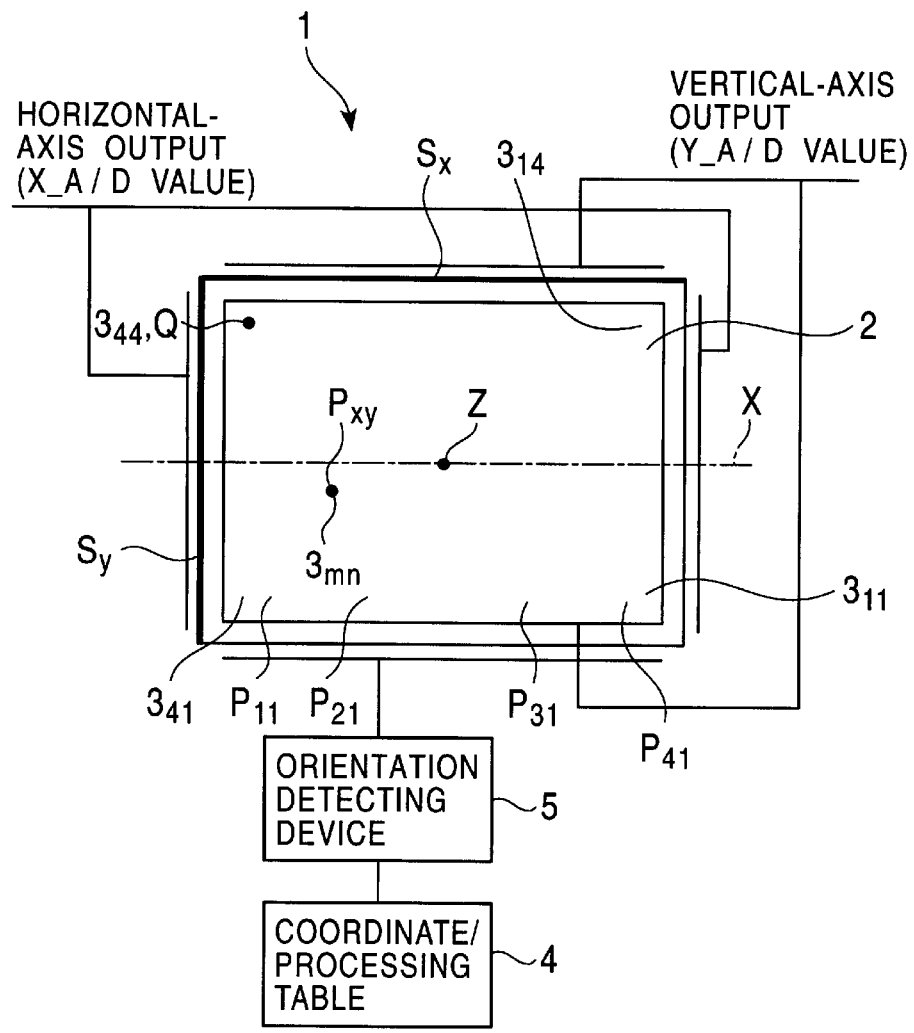
FIG. 1 is a front view illustrating a display unit in a reference orientation according to an embodiment of the present invention.
Figure 3:
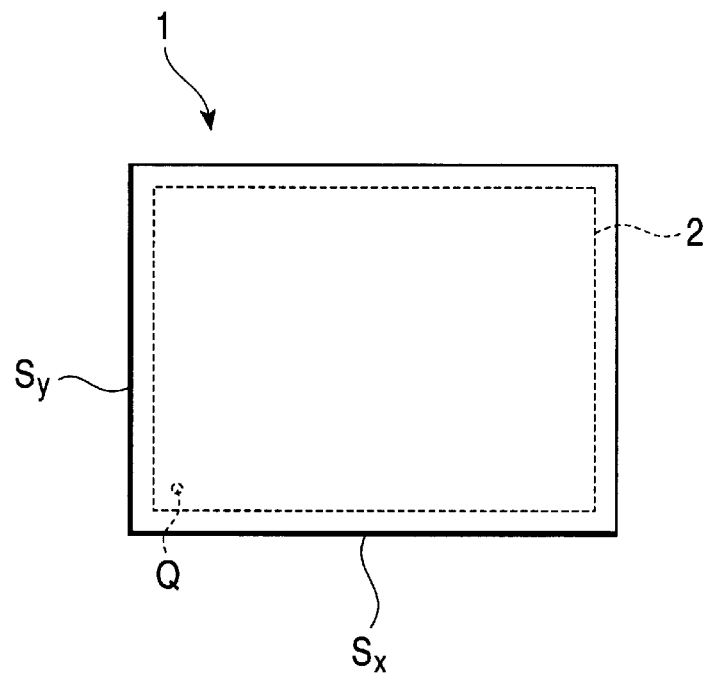
FIG. 3 is a rear view illustrating the display unit which has been rotated by 180 degrees with respect to the horizontal axis X from the state shown in FIG. 1.
Figure 4:
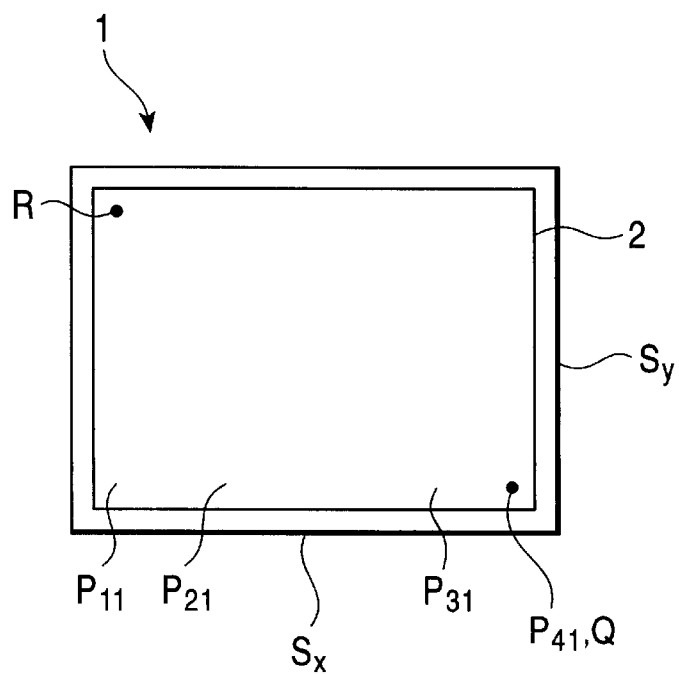
FIG. 4 is a front view illustrating the display unit in the vertically and horizontally inverted state.

A display unit 1 has, as shown in FIGS. 1, 3, and 4, a horizontally elongated rectangular shape, on which a touch panel 2, which serves as a contact-position detecting device, is mounted.

In the touch panel 2, a voltage is applied between the upper side and the lower side in a predetermined direction, and a voltage is also applied between the left side and the right side. When touching a certain part (hereinafter referred to as an "operating part") $3_{mn}$ of the touch panel 2, output voltages (X_A/D_value and Y_A/D_value) in the horizontal direction (X axis) and in the vertical direction (Y axis) are obtained. Based on the output voltages, it is possible to determine which operating part $3_{mn}$ on the touch panel 2 is touched (input). The subscripts "mn" attached to numeral "3" of the operating part designate the magnitudes of the output voltages of the touch panel 2, and for example, the subscripts of the upper left part in the reference orientation (discussed below) are indicated by "44" (see FIG. 1).

More specifically, it is now assumed that the display unit 1 positioned in the orientation illustrated in FIG. 1 is set as a reference (this orientation is referred to as the "reference orientation"), and that the upper left part $3_{44}$ is set as a reference point Q on the coordinates of the operation part $3_{mn}$ of the touch panel 2. When the reference point Q is touched, maximum voltages (X_A/D_value_max, Y_A/D value_max) are output in the horizontal (X) direction and in the vertical (Y) direction. The maximum output voltages (X_A/D_value_max, Y_A/D_value_max) and the minimum output voltages (X_A/D_value_min, Y_A/D_value_min) in the horizontal direction and in the vertical direction have been prepared as data.

When another operating part $3_{mn}$ is input (touched), the position at the input operation part $3_{mn}$ on the touch panel 2 is specified by calculating differences between the output voltages (X_A/D_value, Y A/D_value) of the corresponding part and the maximum output voltages (X_A/D_value_max, Y_A/D_value max) of the reference point Q in the X direction and in the Y direction.

More specifically, when the amounts of change in the A/D_value for one memory in the X direction and in the Y direction are determined to be A/D_value_X and A/D_value_Y, respectively, the coordinates $P_x$ and $P_y$ of the point $P_{xy}$ of the operating part $3_{mn}$ input by using the touch panel 2 can be obtained as follows.

Px (coordinate in the X-axis direction)=|X_A/D_value−X_A/D_value_max|/A/D_value_X Py (coordinate in the Y-axis direction)=|Y_A/D_value−Y_A/D_value max|/A/D_value_Y The amounts of change in the A/D value for one memory can be determined by dividing voltage differences between the above-described maximum output voltages (X_A/D_value_max, Y_A/D_value_max) and the minimum output voltages (X_A/D_value_min, Y_A/D_value_min) by the number of memories.

The display unit 1 is provided with a memory device (table) 4 which stores relationships between predetermined processing (operation) and coordinate positions $P_x$, $P_y$ determined relative to the orientation in which the display unit 1 has been displaced. The subscripts "xy" attached to the symbol "P" at the coordinate position are designated relative to the two-dimensional absolute coordinates of the display unit 1 as viewed from the front. For example, the lower left part is indicated by "11".

Figure 2:
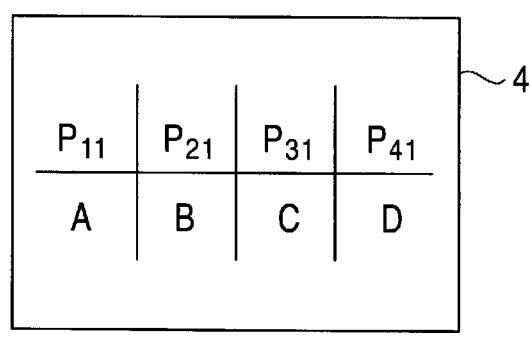
FIG. 2 illustrates a table used in the display unit shown in FIG. 1.

More specifically, in the table 4, the coordinate position $P_x$ and $P_y$ on the two-dimensional coordinates when the touch panel 2 is viewed from the front is related to the content of predetermined processing. When the lower left part $P_{11}$ of the touch panel 2 viewed from the front is touched, processing "A" is performed. Upon touching the part $P_{21}$, which is placed to the right of the part $P_{11}$, processing "B" is executed, and upon touching the part $P_{31}$, which is placed to the right of the part $P_{21}$, processing "C" is performed. When the lower right part $P_{41}$ is touched, processing "D" is executed. Such relationships are shown in FIG. 2.

The above-described coordinate position $P_x$,$P_y$ is a position located on two-dimensional absolute coordinates when the touch panel 2 is viewed from the front. Accordingly, even if the orientation of the touch panel 2 is changed, the operating parts of the touch panel 2 remain the same, namely, the lower left part is "$P_{11}$", the adjacent part to the right is $P_{21}$, and the next adjacent part to the right is $P_{31}$, and the lower right part is $P_{41}$.

With this arrangement, for example, when the operating part of the display unit 1 input in the reference orientation is the lower left part $P_{11}$, the processing (operation) A is executed in accordance with the table 4.

As discussed above, the aforementioned display unit 1 may sometimes be used by changing its orientation, and the orientation of the display unit 1 is detected by an orientation detecting device 5, i.e., to which orientation the display unit 1 has been rotated with respect to the X, Y, and Z axes.

Among the four outer sides of the display unit 1 shown in FIG. 1, the upper side and the left side are indicated by solid lines $S_x$ and $S_y$, respectively, and are used as a guide when the orientation of the display unit 1 is changed.

The display unit 1 is rotated from the reference orientation by 180 degrees with respect to the horizontal axis X. When the display unit 1 is viewed from the opposite side of the plane of FIG. 3, it can be seen as shown in FIG. 4 (this orientation is referred to as "vertically and horizontally inverted orientation"). The state of the display unit 1 shown in FIG. 4 is obtained by rotating the display unit 1 shown in FIG. 3 by 180 degrees with respect to the vertical axis Y. In FIG. 4, the solid lines $S_x$ and $S_y$ are located at the lower side and the right side, respectively, and the reference point Q is displaced to the lower right part. The state of the display unit 1 shown in FIG. 4 is obtained by rotating the display unit shown in FIG. 1 by 180 degrees in the direction Z orthogonal to the plane of FIG. 1.

The orientation detecting device 5 then detects that the display unit 1 has been vertically and horizontally inverted, and also, a new reference point R on the touch panel 2 is determined.

That is, upon detecting that the display unit 1 has been vertically and horizontally inverted, the orientation detecting device 5 determines that the reference point (upper left part) for determining coordinates of the touch panel 2 is R.

The reference point R is used as a reference for specifying each operating point $3_{mn}$ of the touch panel 2 as a two-dimensional coordinate position $P_{xy}$. Even if the orientation of the display unit 1 is changed, as stated below, the reference point is always set at the upper left part when the operator views the display unit 1 from the front. Thus, according to the display unit 1 located in the vertically and horizontally inverted orientation, such as the one shown in FIG. 4, when the new reference point R is touched, the minimum voltages (X_A/D_value_min, Y_A/D_value_min) are output in the horizontal (X) direction and in the vertical (Y) direction.

Coordinates $P_x, P_y$ of the operating part $3_{mn}$ input by using the touch panel 2 of the vertically and horizontally inverted display unit 1 are obtained as follows.

$P_x$ (coordinate in the X-axis direction)=|X_A/D_value−X_A/D_value min|/A/D_value_X $P_y$ (coordinate in the Y-axis direction)=|Y_A/D_value−Y_A/D_value_min|/A/D_value_Y Accordingly, even if the display unit 1 is located in the vertically and horizontally inverted orientation, the coordinate position $P_{xy}$ of a certain operating part $3_{mn}$ on the touch panel 2 can be determined based on the new reference point R. For example, when the operating part $3_{mn}$ input on the vertically and horizontally inverted display unit 1 is the lower left part $P_{11}$, the corresponding processing (operation) is performed in accordance with the table 4, which is the same processing as that when the lower left part $P_{11}$ on the display unit 1 placed in the reference orientation, as shown in FIG. 1, is touched.

The operator is thus able to perform the same processing (operation) A when the lower left part $P_{11}$ is input while viewing the display unit 1 in the reference orientation from the front and when the lower left part $P_{11}$ is input while viewing the vertically and horizontally inverted display unit 1 from the front.

FIGS. 5 through 14 illustrate a video camera 6 according to an embodiment of the present invention by using the above-described display unit 1 as an external display monitor 7.

The video camera 6 is provided with an EVF 8 and the external display monitor 7 as an image display system for displaying subject images or recorded images while performing a recording operation or a playback operation, respectively (FIGS. 5 and 7 through 10).

Although the EVF 8 and the external display monitor 7 are different in size, they both use a liquid crystal display (LCD) as a display unit.

Figure 8:
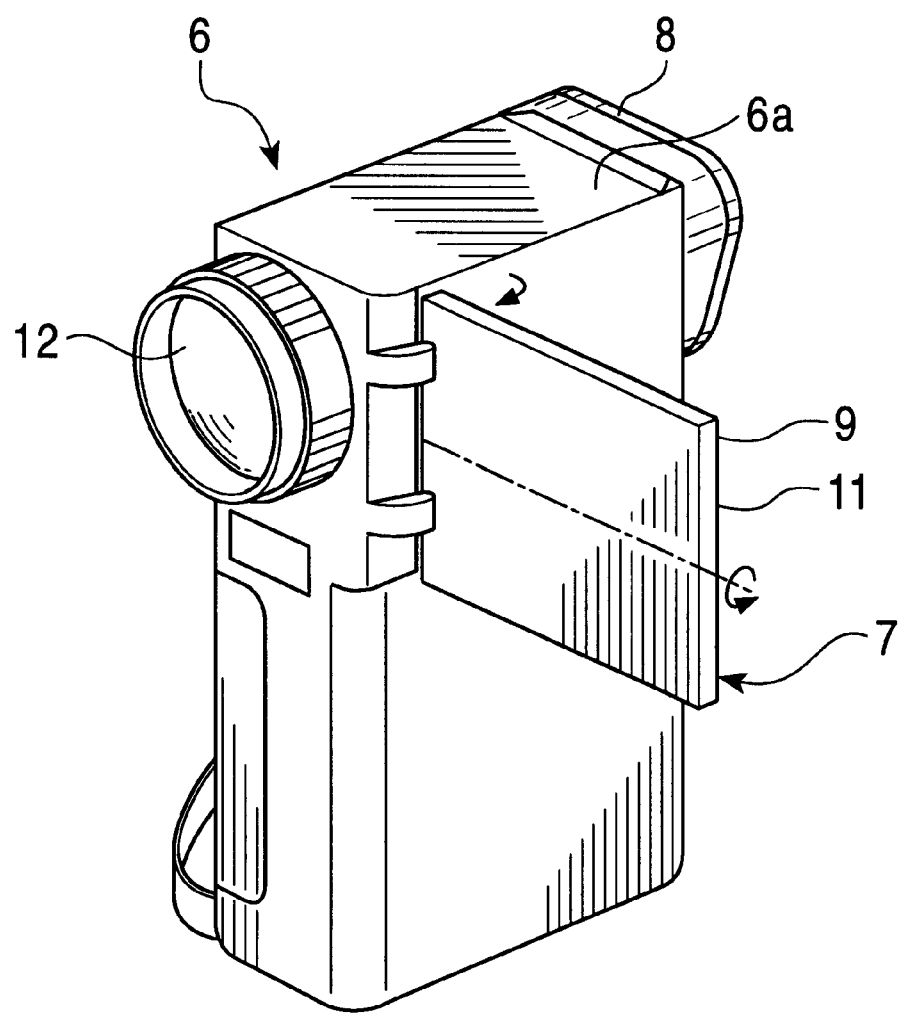
FIG. 8 is a perspective view illustrating the video camera in a normal recording mode.

The external display monitor 7 is pivotally (opening/closing state) and rotatably (at 0 and 180 degrees) supported by a video camera main unit 6a, as indicated by the arrows shown in FIG. 8. The external display monitor 7 has an LCD panel 9 and a touch panel 11, which is attached to an image display screen 10 of the LCD panel 9, and the touch panel 11 is transparent and images on the image display screen 10 can be seen therethrough.

Figure 5:
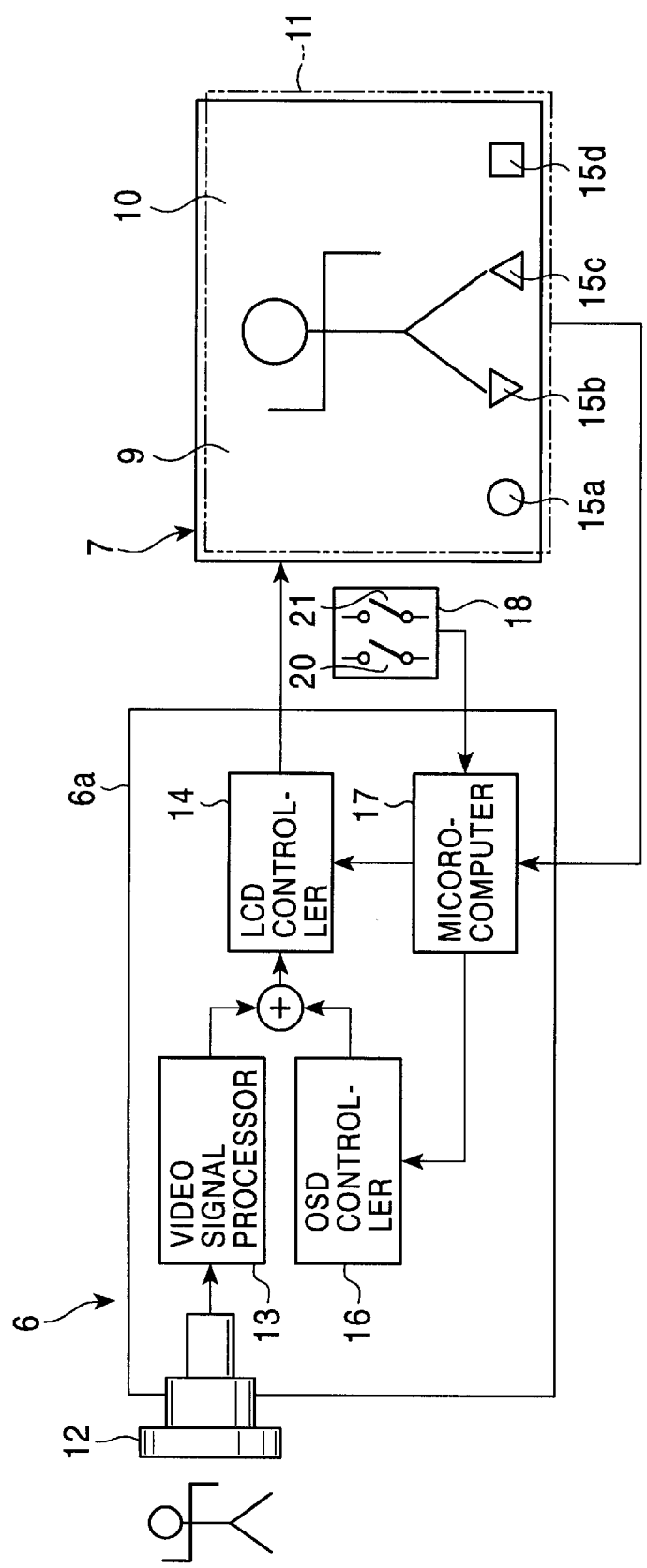
FIG. 5 is an overall circuit diagram illustrating a video camera according to an embodiment of the present invention.

The video camera 6 includes the following elements, as shown in FIG. 5. A video signal processor 13 converts a video picture imaged by an optical system 12 into an electrical signal. An LCD controller 14 displays images on the LCD panel 9. An On Screen Display (OSD) controller 16 creates display images 15 for various operations performed on the touch panel 2 (which will be discussed below). A microcomputer 17 controls the LCD controller 14 and the OSD controller 16. A monitor-orientation detecting switch 18 detects the orientation of the external display monitor 7.

The OSD controller 16 creates the display images 15 for various operations on the touch panel 11 and outputs them to the LSD controller 14 as electrical signals. In FIG. 5, as the display images 15, 15a, 15b, 15c, and 15d are indicated by ○, ▽, △, and □, respectively, and other images, such as operation commands of the video camera 6 may also be displayed.

The LCD controller 14 mixes video signals output from the video signal processor 13 with operation display signals corresponding to the operation display images 15 output from the OSD controller 16, and outputs the mixed signals to the external display monitor 7 (FIG. 5).

The monitor-orientation detecting switch 18, which is built in a hinge unit formed between the video camera main unit 6a and the external display monitor 7, detects the orientation of the external display monitor 7 with respect to the video camera main unit 6a and outputs the detected orientation to the microcomputer 17. More specifically, the monitor-orientation detecting switch 18 detects the pivoting state (opening/closing state) of the external display monitor 7 with respect to the video camera main unit 6a and the rotation state with respect to the horizontal axis. The state in which the external display monitor 7 is opened and is not rotated is referred to as the "normal recording mode"; the state in which the external display monitor 7 is closed and is rotated by 180 degrees is referred to as the "VCR mode"; and the state in which the external display monitor 7 is opened and is rotated by 180 degrees is referred to as the "mirror mode". In the normal recording mode, the external display monitor 7 is mainly used as the EVF 8 for performing a recording operation (see FIG. 8). In the "VCR mode", the video camera 6 is mainly used as a recording/playback unit for playing back recorded data (see FIG. 9). In the "mirror mode", primarily, the operator is a subject and takes an image of himself/herself while standing in front of the camera 6 and observing the external display monitor 7 (FIG. 10). The microcomputer 17 determines which mode is used based on the output of the above-described monitor-orientation detecting switch 18 according to the orientation of the external display monitor 7 with respect to the video camera main unit 6a (see FIG. 5). The monitor-orientation detecting switch 18 is discussed in detail below.

After detecting the orientation of the external display monitor 7 with respect to the video camera main unit 6a, the microcomputer 17 instructs the LCD controller 14 to invert or rotate the display screen. In response to this instruction, the LCD controller 14 displays an image on the LCD panel 9 by inverting or rotating a video signal and an operation display signal (see FIG. 5).

The monitor-orientation detecting switch 18 is formed of, for example, a first switch 20 for detecting the opening/closing state of the external display monitor 7 with respect to the video camera main unit 6a and a second switch 21 for detecting 180-degree rotation of the external display monitor 7 with respect to the horizontal axis.

Figure 7:
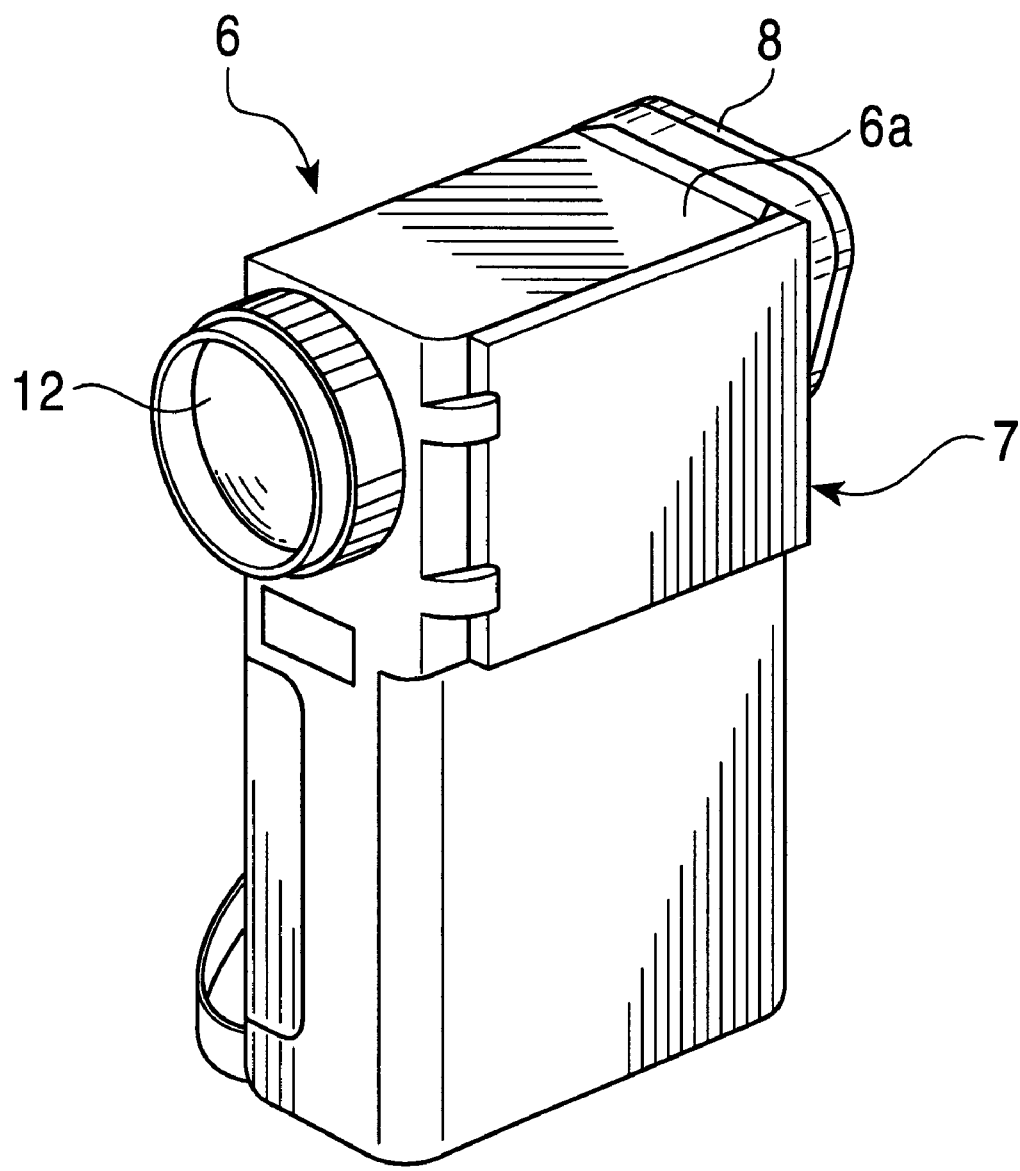
FIG. 7 is a perspective view illustrating the video camera shown in FIG. 6 when it is closed.

More specifically, the first switch 20 is off when the external display monitor 7 is closed with respect to the video camera main unit 6a, as shown in FIG. 7. In contrast, the first switch 20 is on when the external display monitor 7 is opened with respect to the video camera main unit 6a, as illustrated in FIG. 8.

Figure 9:
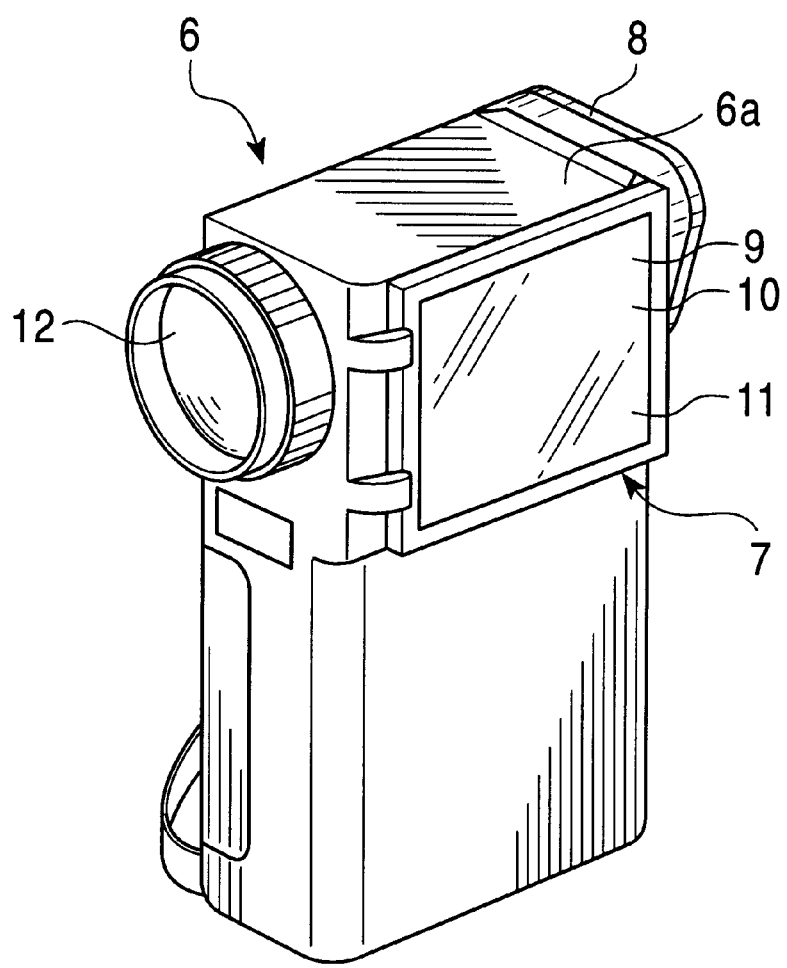
FIG. 9 is a perspective view illustrating the video camera in a VCR mode.
Figure 10:
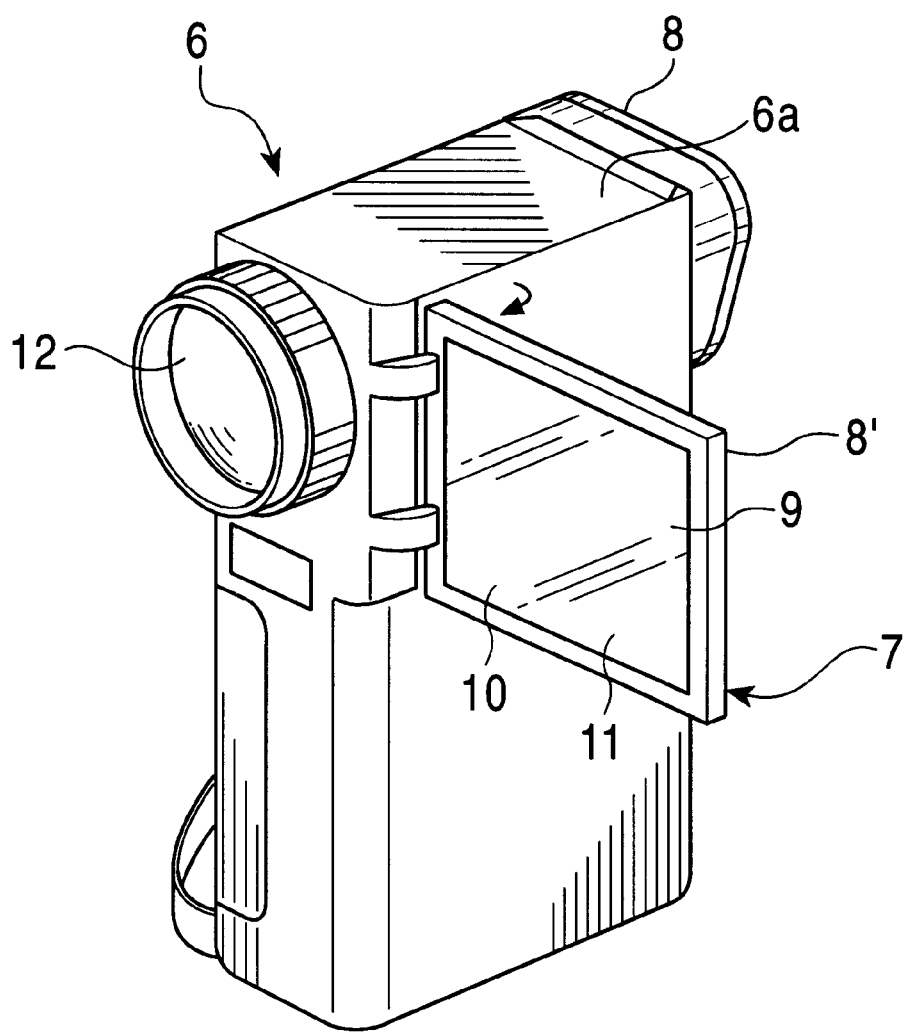
FIG. 10 is a perspective view illustrating the video camera in a mirror mode.

When the external display monitor 7 is not in the rotated state, as shown in FIG. 8, the second switch 21 is off, and when the external display monitor 7 is rotated by 180 degrees with respect to the horizontal axis X (inside out), as illustrated in FIG. 9, from the state shown in FIG. 8, the second switch 21 is turned on.

Figures 13, 14:
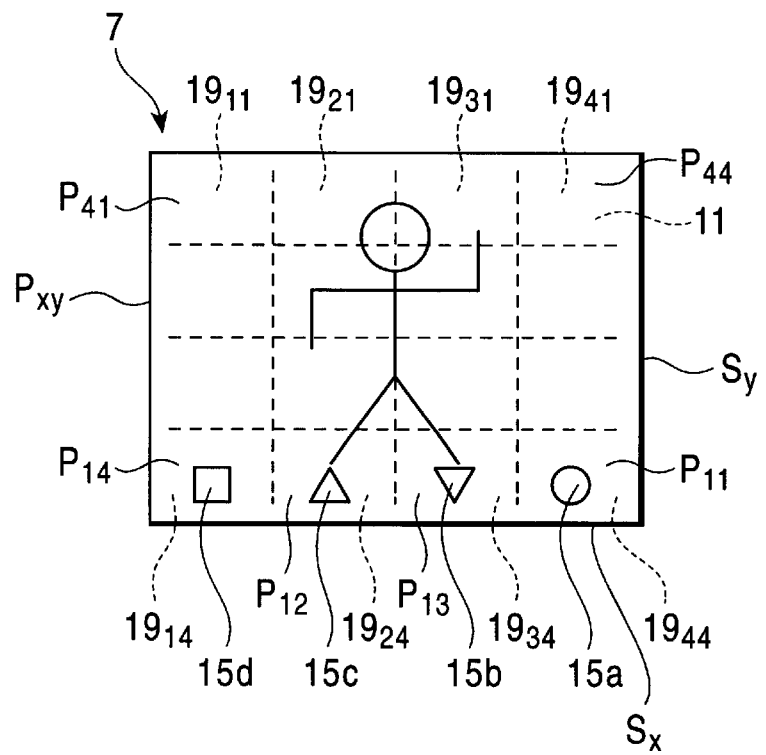
FIG. 13 is a front view illustrating the external display monitor in the mirror mode.
FIG. 14 illustrates relationships between a monitor-orientation detecting switch and the individual modes.

With this arrangement, the microcomputer 17 detects the mode of the video camera 6, as illustrated in FIG. 14, as follows. The video camera 6 is in the normal recording mode when the first switch 20 is on and the second switch 21 is off; the video camera 6 is in the mirror mode when both the first switch 20 and the second switch 21 are on; and the video camera 6 is in the VCR mode when the first switch is off and the second switch is on. A device for detecting the mode is not restricted to the above-described monitor-orientation detecting switch 18, and an acceleration sensor may be used for detecting the movement of the external display monitor 7.

Figure 6:
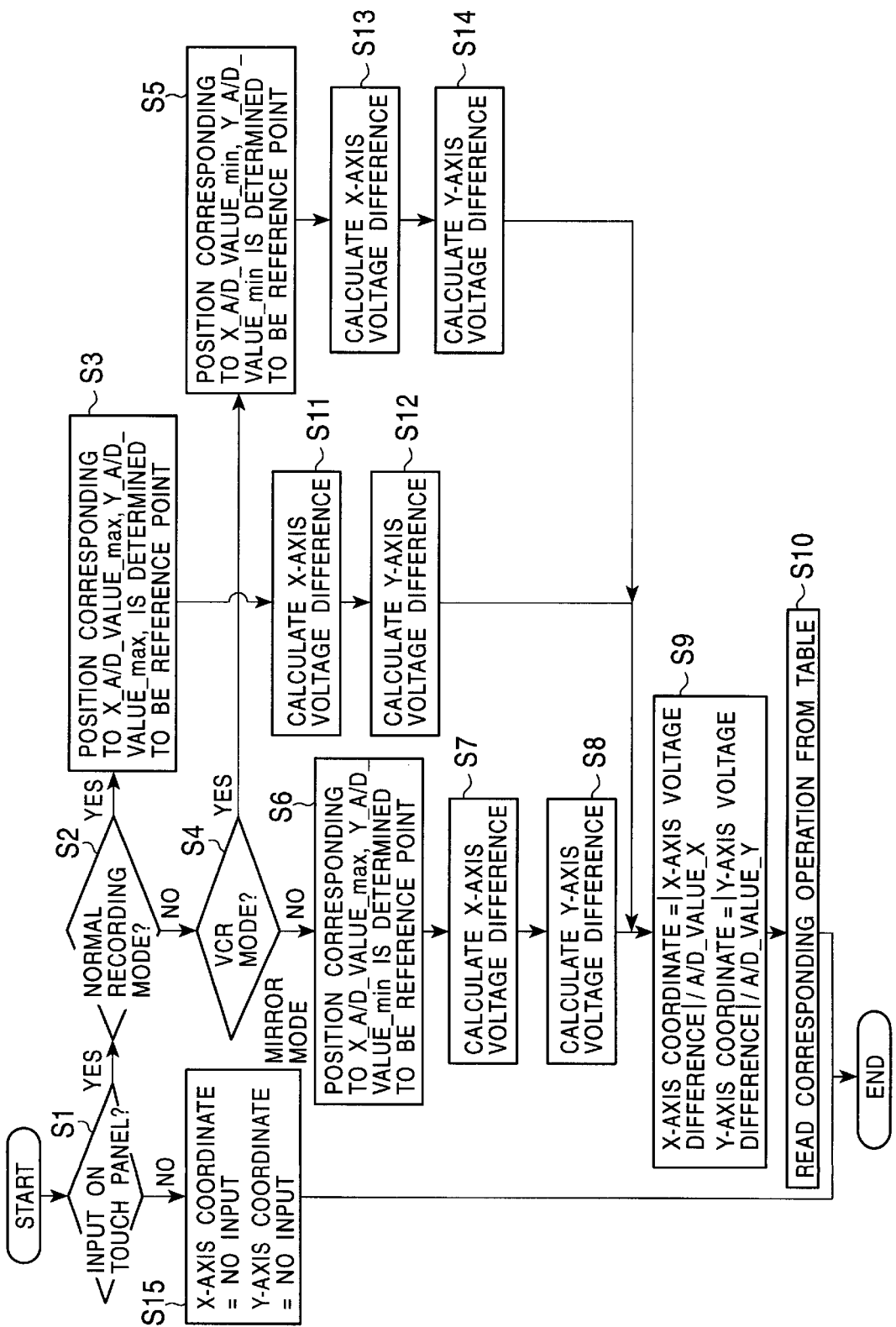
FIG. 6 is a flow chart illustrating a process for transforming the operating part of a touch panel into a coordinate position and for performing predetermined operation corresponding to the coordinate position.

FIG. 6 is a flow chart illustrating a process for transforming the operating part of the touch panel 11 in each mode into a coordinate position of the touch panel 11 and for performing a predetermined operation corresponding to the coordinate position.

In step S1, it is first determined whether there is an input on the touch panel 11. If the outcome of step S1 is no, the process proceeds to step S15 in which no operation is performed. The process is then completed. If it is found in step S1 that there is an input on the touch panel 11, the process proceeds to step S2.

In step S2, it is determined whether the video camera 6 is in the normal recording mode. If the result of step S2 is yes, the process proceeds to step S3.

If the outcome of step S2 is no, the process proceeds to step S4 in which it is determined whether the video camera 6 is in the VCR mode. If the result of step S4 is yes, the process proceeds to step S5. If it is found in step S4 that the video camera 6 is not in the VCR mode, the process proceeds to step S6.

The determinations in steps S2 and S4 are made by, for example, the monitor-orientation detecting switch 18 as discussed above.

In the normal recording mode determined in step S2, the external display monitor 7 is used as the EVF 8 of the video camera 6 for performing a recording operation. More specifically, by opening the external display monitor 7 with respect to the video camera main unit 6a from the state shown in FIG. 7 to the state shown in FIG. 8 (in other words, by rotating the external display monitor 7 by 90 degrees with respect to the vertical axis Y), the operator performs a recording operation while viewing an image of a subject on the external display monitor 7. The orientation of the external display monitor 7 viewed from the front in the normal recording mode is determined to be the "reference orientation", which is discussed below (see FIG. 8).

Figure 11:
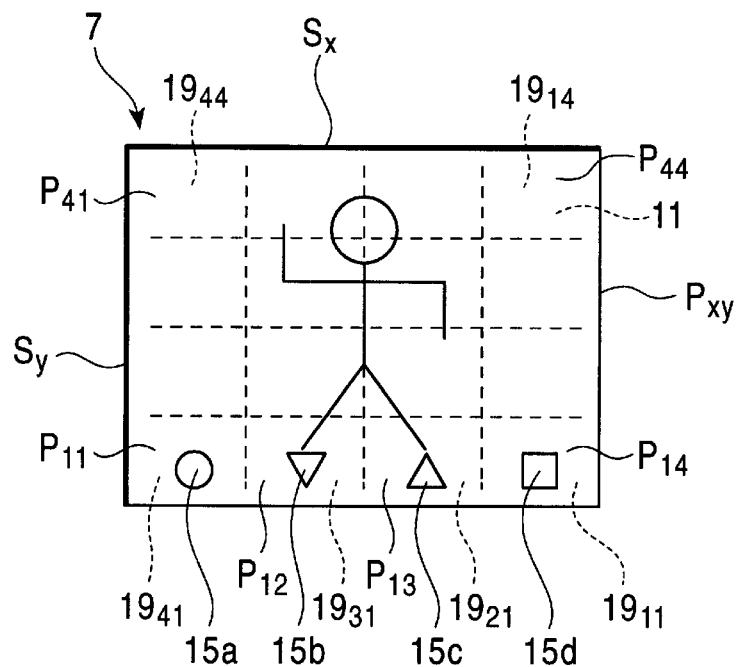
FIG. 11 is a front view illustrating an external display monitor in the normal recording mode.

On the external display monitor 7 in the normal recording mode, the images obtained by mixing a video signal output from the video signal processor 13 and an operation display signal generated by the OSD controller 16 are displayed in the orientation in which the video image has been recorded and in the orientation in which the display image has been created. The operation display images 15 are sequentially indicated, as illustrated in FIG. 11, by display images 15a, 15b, 15c, and 15d (symbols ○, ▽, △, and □, respectively) from the left. By touching the operating parts $19_{mn}$ ($19_{41}$, $19_{31}$, $19_{21}$, and $19_{11}$) on the touch panel 11 corresponding to the operation display images 15a, 15b, 15c, and 15d, respectively, operations associated with such display images 15a, 15b, 15c, and 15d are performed. The subscripts "mn" attached to the numeral "19" of the operating part indicate the magnitudes of the output voltages of the touch panel 11, and for example, the subscripts of the upper left part of the external display monitor 7 in the reference orientation are represented by "44" (see FIG. 11). That is, in step S3 of FIG. 6, the operating part $19_{44}$ at which the maximum voltages X_A/D_value_max and Y_A/D_value_max are obtained is determined to be a reference point.

More specifically, upon touching (inputting) the operating part $19_{mn}$ on the touch panel 11 corresponding to a predetermined operation display image 15, the two-dimensional coordinate position $P_{xy}$ on the touch panel 11 corresponding to the touched operating part $19_{mn}$ is detected in the manner described above, and the processing (operation) associated with the operating part $19_m$ is operated in accordance with the table 4 which stores the relationship between the coordinate position $P_{xy}$ and the corresponding operation. The subscripts "xy" attached to the symbol "P" of the coordinate position is a position according to the two-dimensional absolute coordinates of the display unit viewed from the front, and for example, the subscripts of the lower left part are indicated by "11".

More specifically, the table 4 stores relationships between the coordinate positions $P_{11}$, $P_{12}$, $P_{13}$, and $P_{14}$ on the two-dimensional coordinates of the touch panel 11 viewed from the front and the contents of predetermined processing (A, B, C, and D). When the lower left part $P_{11}$ of the touch panel 11 viewed from the front is touched, processing (operation) A is performed. Upon touching the part $P_{12}$, which is located to the right of the part $P_{11}$, processing B is performed. Upon touching the part $P_{13}$, which is located to the right of the part $P_{12}$, processing C is executed. When the lower right part $P_{14}$ is touched, processing D is executed.

Thus, for example, the operating part $19_{41}$ of the touch panel 11 corresponds to the display image 15a (symbol ○), and upon touching the operating part $19_{41}$, the two-dimensional absolute coordinate position $P_{11}$ is determined, and the operation A is performed based on the table 4.

As discussed above, since the operation display images 15a, 15b, 15c, and 15d are associated with the two-dimensional coordinate positions $P_{11}$, $P_{12}$, $P_{13}$, and $P_{14}$, respectively, the operator is able to easily visualize the corresponding operations based on the images 15a through 15d.

The above-described operation is discussed below with reference to the flow chart of FIG. 6. The voltage differences between the input point and the reference point in the X direction and in the Y direction are calculated in steps S11 and S12, respectively. Then, the process proceeds to step S9. In step S9, the coordinates $P_x$ and $P_y$ of the operating part are determined as follows.

$P_x$ (coordinate in the X-axis direction)=|the voltage difference in the X direction|/A/D_value_X $P_x$ (coordinate in the Y-axis direction)=|the voltage difference in the Y direction|/ A/D_value_Y Then, in step S10, the corresponding processing (operation) is read from the table 4, and the process is completed.

In the VCR mode determined in step S4, the video camera 6 is used as a recording/playback device for playing back recorded data. In this case, the external display monitor 7 is closed with respect to the video camera main unit 6a with the image screen 10 facing outside. This state is obtained by rotating the external display monitor 7 by 180 degrees with respect to the horizontal axis X from the state in the normal recording mode, and by closing the external display monitor 7 with respect to the video camera main unit 6a. That is, the external display monitor 7 is vertically and horizontally inverted (see FIG. 9).

An image displayed on the external display monitor 7 viewed from the front in the VCR mode should be similar to that in the normal recording mode. It is thus necessary to vertically and horizontally invert both the video image and the operation display image.

Figure 12:
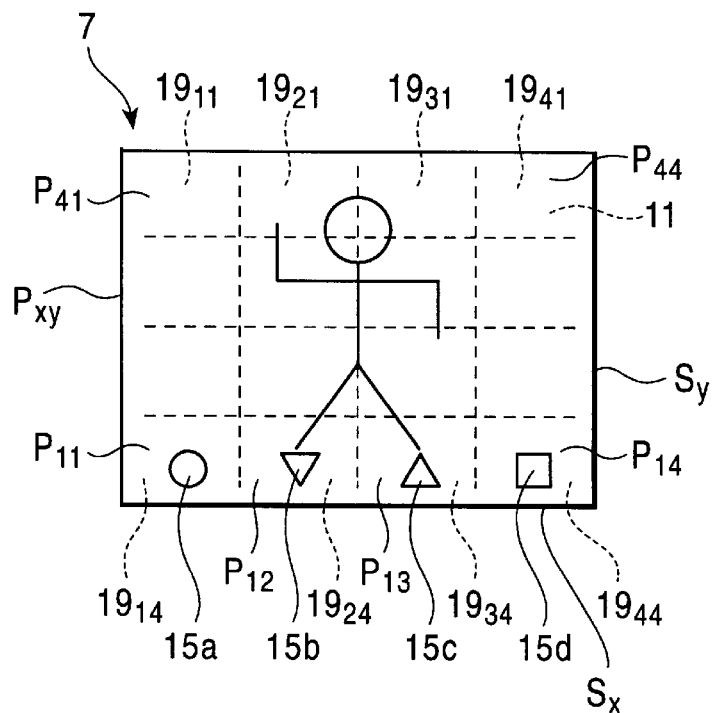
FIG. 12 is a front view illustrating the external display monitor in the VCR mode.

Accordingly, upon detecting that the external display monitor 7 has been vertically and horizontally inverted, the monitor-orientation detecting switch 18 outputs the corresponding information to the microcomputer 17, which then instructs the LCD controller 14 to display the image by inverting the above-described mixed image signal. This makes it possible to display the same image as that displayed in the normal recording mode even when the vertically and horizontally inverted external display monitor 7 is viewed from the front in the VCR mode. FIG. 12 illustrates the vertically and horizontally inverted video image and operation display images.

That is, even on the vertically and horizontally inverted external display monitor 7, the display images 15a, 15b, 15c, and 15d (○, ▽, △, and □) are sequentially indicated from the left (see FIG. 12).

However, in the VCR mode, the touch panel 11, as well as the external display monitor 7, is vertically and horizontally inverted, and the operating part $19_{mn}$ of the touch panel 11 is also in the vertically and horizontally inverted state. Accordingly, although the operating parts $19_{41}$, $19_{31}$, $19_{21}$, and $19_{11}$ of the touch panel 11 in the reference orientation are sequentially displayed from the left to the right at the bottom, they are located from the right to the left at the top in the vertically and horizontally inverted orientation (see FIG. 12).

Thus, the part of the touch panel 11 corresponding to the display image 15a (symbol ○) is the operating part $19_{14}$, as illustrated in FIG. 12.

Therefore, as stated above, the reference point of the coordinate position $P_{xy}$ concerning the operating part $19_{mn}$ is changed, and based on the new reference point, the coordinate position $P_{xy}$ of each operating part $19_{mn}$ is calculated so that parts corresponding to the coordinate positions $P_{11}$, $P_{12}$, $P_{13}$, and $P_{14}$ are determined to be the operating parts $19_{14}$, $19_{24}$, $19_{34}$, and $19_{44}$, respectively.

More specifically, for example, when touching the operating part $19_{14}$ of the touch panel 11 corresponding to the display image 15a (symbol ○), the coordinate position $P_{11}$ is calculated based on the corresponding output voltage, and the operation A is executed in accordance with the above-described table 4.

In this manner, in the VCR mode, as well as in the normal recording mode, the two-dimensional coordinate positions $P_{11}$, $P_{12}$, $P_{13}$, and $P_{14}$ correspond to the display images 15a, 15b, 15c, and 15d, respectively. This enables the operator to easily visualize the processing (operations) based on the associated display images 15a, 15b, 15c, and 15d.

The above-described operation in the VCR mode is described below with reference to FIG. 6. In step S5, the operating part at which the minimum voltages X_A/D_value_min and Y_A/D_value_min are obtained is determined to be a reference point. Then, voltage differences between the input point and the reference point in the X direction and in the Y direction are calculated in steps S13 and S14, respectively. The process then proceeds to step S9.

In step S9, the coordinates $P_x$ and $P_y$ of the operating part are determined as follows.

$P_x$ (coordinate in the X-axis direction)=|the voltage difference in the X direction|/A/D_value_X $P_y$ (coordinate in the Y-axis direction)=|the voltage difference in the Y direction|/ A/D_value_Y Then, in step S10, the corresponding processing (operation) is read from the table 4, and the process is completed.

If it is found in step S4 that the video camera 6 is not in the VCR mode, it is determined in step S6 that the video camera 6 is in the mirror mode. In the mirror mode, the operator is a subject while standing in front of the video camera 6 and observing the external display monitor 7. In this case, the external display monitor 7 is rotated by 180 degrees with respect to the horizontal axis X from the normal recording mode. That is, the external display monitor 7 is vertically and horizontally inverted (see FIG. 10).

In the mirror mode, a video image should be displayed as if the operator is looking at an image in a mirror. Thus, since the external display monitor 7 has already been vertically and horizontally inverted, it is necessary to invert the video image only in the vertical direction.

Accordingly, by detecting that the video camera 6 is in the mirror mode, the orientation detecting switch 18 outputs a corresponding signal to the microcomputer 17. In response to this signal, the microcomputer 17 instructs the LCD controller 14 to invert the mixed display image only in the vertical direction.

However, the LCD controller 14 is used for controlling the display image obtained by mixing the video signal and the operation display signal. Thus, if the LCD controller 14 displays the mixed display image by inverting it only in the vertical direction, the operation display images 15a, 15b, 15c, and 15d remain horizontally inverted. Accordingly, the display image 15a (symbol ○) which is displayed on the lower left part of the touch panel 11 in the reference orientation is displayed on the lower right part.

In this state, when the operator intends to perform the operation A by touching the operating part based on the display image 15a (symbol ○) on the lower right part, the position at which the image 15a (symbol ○) is displayed is the operating part $19_{44}$ of the touch panel 11, which corresponds to the coordinate position $P_{14}$ of the touch panel 11. As a result, processing (operation) D is disadvantageously executed in accordance with the table 4.

Therefore, in step S6, the reference point is set according to the position at which X_A/D_value_max and Y_A/D_value_min are obtained. Then, the voltage differences between the input point and the reference point in the X direction and in the Y direction are calculated in steps S7 and S8, respectively. The process then proceeds to step S9. In step 9, the coordinates $P_x$ and $P_y$ of the operating part are determined as follows.

$P_x$ (coordinate in the X-axis direction)=|the voltage difference in the X direction|/A/D_value_X $P_y$ (coordinate in the Y-axis direction)=|the voltage difference in the Y direction|/A/D_value_Y With this arrangement, by inputting the display image 15a (symbol ○) displayed on the lower right of the screen, the operating part $19_{14}$ is touched, and the processing (operation) A corresponding to the input image 15a (symbol ○) is performed (see FIG. 13).

Then, in step S10, the corresponding processing (operation) is read from the table 4, and the process is completed.

In the aforementioned mirror mode, the images (characters or symbols) 15 displayed on the external display monitor 7 are horizontally inverted as if the operator is looking at an image in a mirror. Thus, characters and symbols which are not horizontally symmetrical may mislead the operator or cause erroneous operations. In order to overcome this drawback, the characters and symbols in the mirror state may be stored in the OSD controller 16 in advance. When the monitor-orientation detecting switch 18 detects that the video camera 6 is in the mirror mode, the microcomputer 17 instructs the LCD controller 14 to invert the mixed display image only in the vertical direction, and may also instruct the OSD controller 16 to output the characters and symbols in the mirror state.

Additionally, the order of displaying the images (characters and symbols) 15 in the normal mode is also horizontally inverted in the mirror mode. Accordingly, the characters and symbols which are meaningful in the normal order may mislead the operator or cause erroneous operations. Thus, the characters and symbols in the mirror state may be stored in the OSD controller 16 in advance, so that the display images are output in the reversed order, thereby easily displaying the images in the proper order. That is, the microcomputer 17 instructs the LCD controller 14 to invert the mixed display image only in the vertical direction, and may also instruct the OSD controller 16 to output the characters and symbols in the mirror state and to reverse the order of outputting them. As a consequence, only the video signals are horizontally inverted, and the images 15 displayed on the external display monitor 7 appear the same in the normal recording mode and in the mirror mode. In this case, the operating part is processed in a manner similar to the VCR mode.

In this embodiment, the mode to be used is specified by using the monitor-orientation detecting switch 18, and the relationship between the screen display and the contact-position detecting device is indicated. However, the mode to be used may be specified by the operating mode of the image pick-up apparatus. For example, even if the image pick-up apparatus is set in the VCR mode and the external display monitor 7 is set at the corresponding position, the above-described mirror mode processing can be performed in response to an instruction to change the mode from the VCR mode to the mirror mode from the operation mode of the image pick-up apparatus regardless of the position of the monitor-orientation detecting switch 18.

Although in the foregoing embodiment the present invention is applied to a video camera, it may be used in an electronic still camera incorporating an EVF and an external monitor.

The foregoing embodiment describes the mode in which the display unit is rotated by 180 degrees with respect to the axis Z orthogonal to the screen. In the present invention, however, the display unit may be rotated by 90 degrees with respect to the Z axis, i.e., a horizontally elongated display unit may be rotated to a vertically elongated display unit. For example, a planar image display unit used by changing its orientation may also be employed in the present invention.

In the aforementioned embodiment, specific configurations and structures of the individual elements are merely examples to carry out the present invention, and are by no means intended to limit the scope of the present invention.

What is claimed is:

1. An image pick-up apparatus comprising:

display means pivotally supported by a main unit of said image pick-up apparatus with respect to a vertical axis and rotatably supported by the main unit of said image pick-up apparatus with respect to a horizontal axis;

orientation detecting means for detecting an orientation of a display screen of said display means with respect to the main unit of said image pick-up apparatus;

contact-position detecting means mounted on the display screen of said display means, for detecting which part of the display screen is touched;

memory means for storing relationships between coordinate positions of said contact-position detecting means and predetermined processing; and display control means for displaying an image on said display means based on a signal from said orientation detecting means, and upon detecting by said contact-position detecting means that a predetermined operating part is touched, for transforming the predetermined operating part into a coordinate position in said memory means according to the signal from said orientation detecting means, thereby performing the predetermined processing.

2. An image pick-up apparatus according to claim 1, wherein said orientation detecting means is coupled to a hinge unit formed between the main unit of said image pick-up apparatus and said display means, and said orientation detecting means comprises a first switch for determining whether said display means is in one of an open state and a closed state with respect to the main unit of said image pick-up apparatus and a second switch for determining whether said display means is located in one of a reference position and an inverted position.

3. An image pick-up apparatus according to claim 1, wherein said contact-position detecting means comprises a touch panel.

4. An image pick-up apparatus according to claim 1, wherein said memory means stores a table in which the relationships between the coordinate positions of said contact-position detecting means and the predetermined processing are set.

* * * * *